US012693879B2

(12) United States Patent
Hunt et al.

(10) Patent No.: US 12,693,879 B2
(45) Date of Patent: Jul. 28, 2026

(54) ELECTRONIC DEVICE, AND METHODS OF THE ELECTRONIC DEVICE FOR GENERATING FEEDBACK RELATED TO AN INTERACTION WITH A TOUCH INPUT ARRANGEMENT

(71) Applicant: Telefonaktiebolaget LM Ericsson (publ), Stockholm (SE)

(72) Inventors: Alexander Hunt, Tygelsjö (SE); Fredrik Dahlgren, Lund (SE); Andreas Kristensson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 18/280,232

(22) PCT Filed: Mar. 12, 2021

(86) PCT No.: PCT/EP2021/056429

§ 371 (c)(1),
(2) Date: Sep. 3, 2023

(87) PCT Pub. No.: WO2022/189000

PCT Pub. Date: Sep. 15, 2022

(65) Prior Publication Data

US 2024/0168782 A1      May 23, 2024

(51) Int. Cl.
G06F 3/044 (2006.01)
G06F 3/02 (2006.01)
(Continued)

(52) U.S. Cl.
CPC ............... G06F 9/453 (2018.02); G06F 3/02 (2013.01); G06F 3/0416 (2013.01); G06F 3/044 (2013.01);
(Continued)

(58) Field of Classification Search
CPC ........ G06F 3/0416; G06F 3/044; G06F 3/041; G06F 3/02; G06F 3/048; G06F 3/0487; G06F 3/04886; G06F 9/453
See application file for complete search history.

(56) References Cited

U.S. PATENT DOCUMENTS 9,310,905 B2 *   4/2016   Luo ..................... G06F 3/03547
9,311,724 B2 *   4/2016   Luo ......................... G06T 11/20
(Continued)

FOREIGN PATENT DOCUMENTS

CN        201440697 U      4/2010
CN        107481616 A      12/2017
CN        112445341 A      3/2021

OTHER PUBLICATIONS

PCT International Search Report, mailed Nov. 30, 2021, in connection with International Application No. PCT/EP2021/056429, all pages.
(Continued)

*Primary Examiner* — Ting Z Lee

(74) *Attorney, Agent, or Firm* — Murphy, Bilak & Homiller, PLLC

(57) ABSTRACT

A method, performed by an electronic device, for generating feedback related to an interaction with a touch input arrangement. wherein the electronic device comprises a display and wherein the touch input arrangement is arranged outside a display area of the display is provided. In response to a sensed proximity of an object relative to the touch input arrangement, the electronic device displays on the display a graphical representation of the touch input arrangement and a position of the object relative to the touch input arrangement.

17 Claims, 9 Drawing Sheets

(51) Int. Cl.

| | |
|---|---|
| *G06F 3/041* | (2006.01) |
| *G06F 9/451* | (2018.01) |
| *G06F 3/048* | (2013.01) |
| *G06F 3/0487* | (2013.01) |
| *G06F 3/04886* | (2022.01) |

(52) U.S. Cl.
CPC .............. *G06F 3/041* (2013.01); *G06F 3/048* (2013.01); *G06F 3/0487* (2013.01); *G06F 3/04886* (2013.01)

(56) References Cited

U.S. PATENT DOCUMENTS

| | | | | |
|---|---|---|---|---|
| 11,423,865 | B2 * | 8/2022 | Wu | ........................... G09G 5/10 |
| 11,474,693 | B2 * | 10/2022 | Guynes | ................. G06F 3/0484 |
| 2002/0130844 | A1 | 9/2002 | Natoli | |
| 2007/0268261 | A1 | 11/2007 | Lipson | |
| 2013/0155070 | A1 * | 6/2013 | Luo | ........................ G06F 1/1643 |
| | | | | 345/441 |
| 2013/0215005 | A1 * | 8/2013 | Senanayake | ........ G06F 3/04886 |
| | | | | 345/156 |
| 2014/0157203 | A1 | 6/2014 | Jeon et al. | |
| 2015/0287383 | A1 * | 10/2015 | Kim | ......................... G09G 3/20 |
| | | | | 345/204 |
| 2015/0370403 | A1 * | 12/2015 | Nakamura | ............ G06F 1/1626 |
| | | | | 345/173 |
| 2019/0018454 | A1 * | 1/2019 | Jung | ..................... G06F 1/1652 |
| 2019/0243505 | A1 | 8/2019 | Lewis | |
| 2019/0272565 | A1 * | 9/2019 | Roy | ................... G06Q 30/0277 |

OTHER PUBLICATIONS

PCT Written Opinion, mailed Nov. 30, 2021, in connection with International Application No. PCT/EP2021/056429, all pages.

Unknown, "Explore the Next Sense", Acconeer/Radar sensor, https://www.acconeer.com, captured Nov. 16, 2020, 8 pages.

\* cited by examiner

100

112

Display driver

116   ROM    Driver for subpart    114

Touch IC

118

104

Display

Button/s

104b

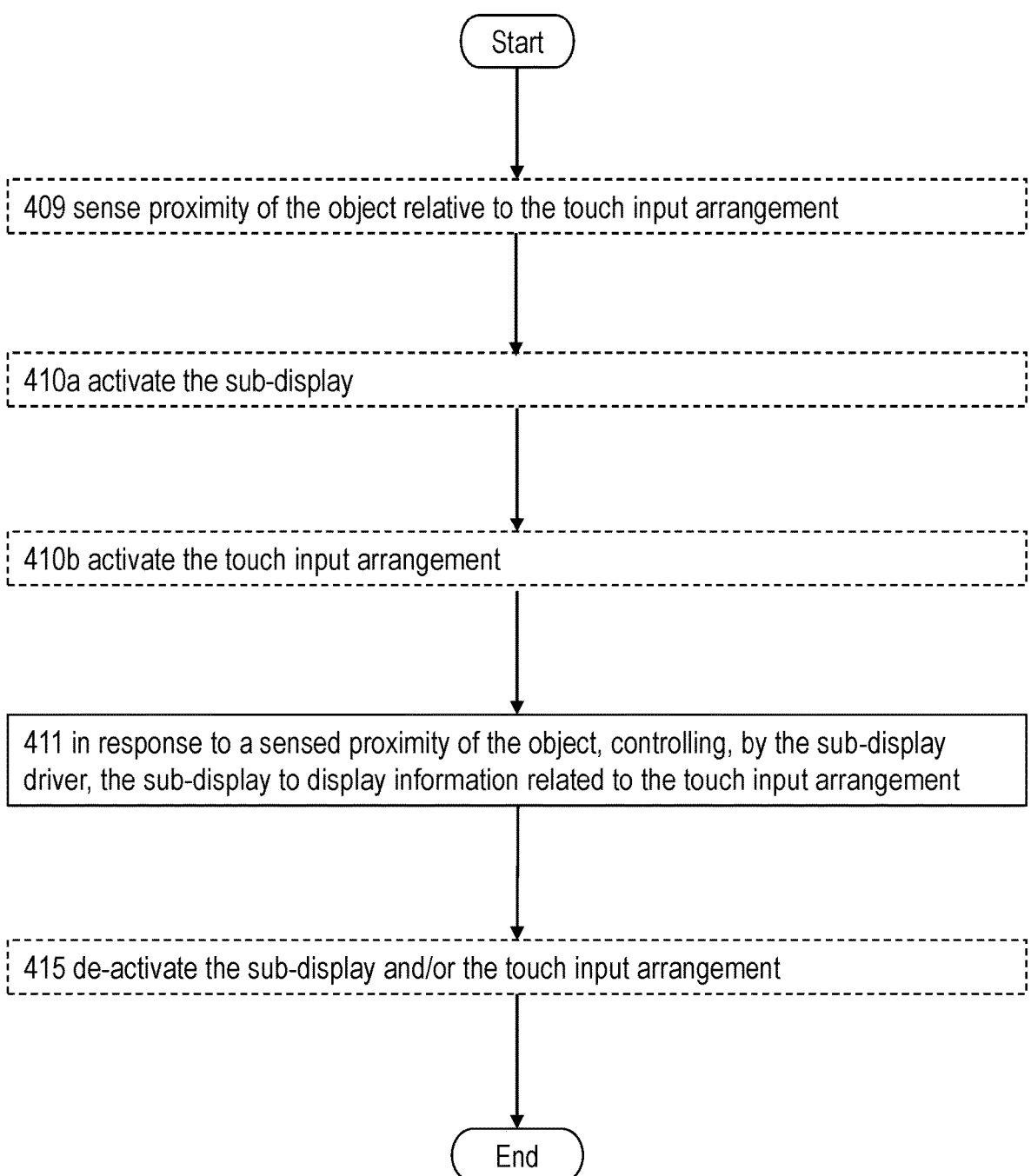

Start 409 sense proximity of the object relative to the touch input arrangement 410a activate the sub-display 410b activate the touch input arrangement 411 in response to a sensed proximity of the object, controlling, by the sub-display driver, the sub-display to display information related to the touch input arrangement 415 de-activate the sub-display and/or the touch input arrangement End

ELECTRONIC DEVICE, AND METHODS OF THE ELECTRONIC DEVICE FOR GENERATING FEEDBACK RELATED TO AN INTERACTION WITH A TOUCH INPUT ARRANGEMENT

TECHNICAL FIELD

The embodiments herein relate to an electronic device and methods for generating feedback related to an interaction with a touch input arrangement. A corresponding computer program and a computer program carrier are also disclosed.

BACKGROUND

Electronic devices tend to have buttons on the side or backside as the manufacturers want to maximize the display vs physical device area. When the buttons are on the side or at the back it is hard to know which button is which and it is also difficult to read a text next to the button if that would exist. The user may need to learn the position of the buttons.

If a physical button of the electronic device is not in direct line of sight, e.g., by being located on a headset being worn by the user, and if there are more than one button closely located on said headset, said user may need to use his or hers fingers to sense an area around the buttons to make sure the right button is being used. This may be cumbersome to the user and may result in the user interacting with a button which the user didn't intend to interact with. In the end the power consumption of the electronic device may be increased.

Furthermore, if a device is not used that often the user might forget about the functionality and placement of the physical buttons and need to relearn.

SUMMARY

A solution may be to present buttons as an overlay on the display once one of the buttons has been pressed to guide and help the user to find the right button to press. However, this solution increases the power-consumption of the electronic device since the display needs to be turned on to be able to display the buttons. Further, the buttons need to be pressed for something to happen. Thus, interaction with the wrong button is likely to happen.

An object of embodiments herein may be to obviate some of the problems described above and related to handling of physical buttons on electronic devices, or at least reduce the impact of them.

According to an aspect, the object is achieved by a method, performed by an electronic device for generating feedback related to an interaction with a touch input arrangement. The electronic device comprises a display and the touch input arrangement is arranged outside a display area of the display. In response to a sensed proximity of an object relative to the touch input arrangement, the electronic device displays on the display, a graphical representation of the touch input arrangement and a position of the object relative to the touch input arrangement.

According to a further aspect, the object is achieved by an electronic device for generating feedback related to an interaction with a touch input arrangement. The electronic device comprises a display and the touch input arrangement is arranged outside a display area of the display. The electronic device is configured to display on the display, a graphical representation of the touch input arrangement and a position of the object relative to the touch input arrangement in response to a sensed proximity of an object relative to the touch input arrangement.

According to a further aspect, the object is achieved by a further method, performed by the electronic device, for generating feedback related to an interaction with a touch input arrangement. The electronic device comprises a display, a display driver, and a sub-display driver. The display comprises a display area, wherein the display area comprises a sub-display area which is smaller than the display area. The display driver is configured to control a respective one of one or more pixels of the display area including one or more pixels of the sub-display area. The sub-display driver is configured to control the respective one of the one or more pixels of the sub-display area. The touch input arrangement is arranged outside the display area of the display.

The display driver is configured to control the one or more pixels of the sub-display area to display information related to the touch input arrangement in response to a sensed proximity of an object relative to the touch input arrangement.

According to a further aspect, the object is achieved by an electronic device for generating feedback related to an interaction with a touch input arrangement. The electronic device comprises a display, a display driver, and a sub-display driver.

The display comprises a display area, wherein the display area comprises a sub-display area which is smaller than the display area.

The display driver is configured to control a respective one of one or more pixels of the display area including one or more pixels of the sub-display area. The sub-display driver is configured to control the respective one of the one or more pixels of the sub-display area. The touch input arrangement is arranged outside the display area of the display.

The electronic device is configured to, by means of the sub-display driver: control the one or more pixels of the sub-display area to display information related to the touch input arrangement in response to a sensed proximity of an object relative to the touch input arrangement.

According to a further aspect, the object is achieved by a computer program comprising instructions, which when executed by a processor, causes the processor to perform actions according to any of the aspects above.

According to a further aspect, the object is achieved by a carrier comprising the computer program of the aspect above, wherein the carrier is one of an electronic signal, an optical signal, an electromagnetic signal, a magnetic signal, an electric signal, a radio signal, a microwave signal, or a computer-readable storage medium.

Since the electronic device displays the graphical representation of the touch input arrangement and the position of the object relative to the touch input arrangement in response to the sensed proximity of the object an improved feedback from the user interface is achieved which improves the user interface guidance and prevents unnecessary user interface usage.

Since the sub-display driver of the electronic device controls the one or more pixels of the sub-display area to display information related to the touch input arrangement an improved feedback from the user interface is achieved which improves the user interface guidance and prevents unnecessary user interface usage while power consumption is reduced.

Further embodiments herein may reduce the power consumption even further.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which:

FIG. 4b is a flowchart illustrating embodiments of a further method performed by an electronic device.

DETAILED DESCRIPTION

Figure 1A:
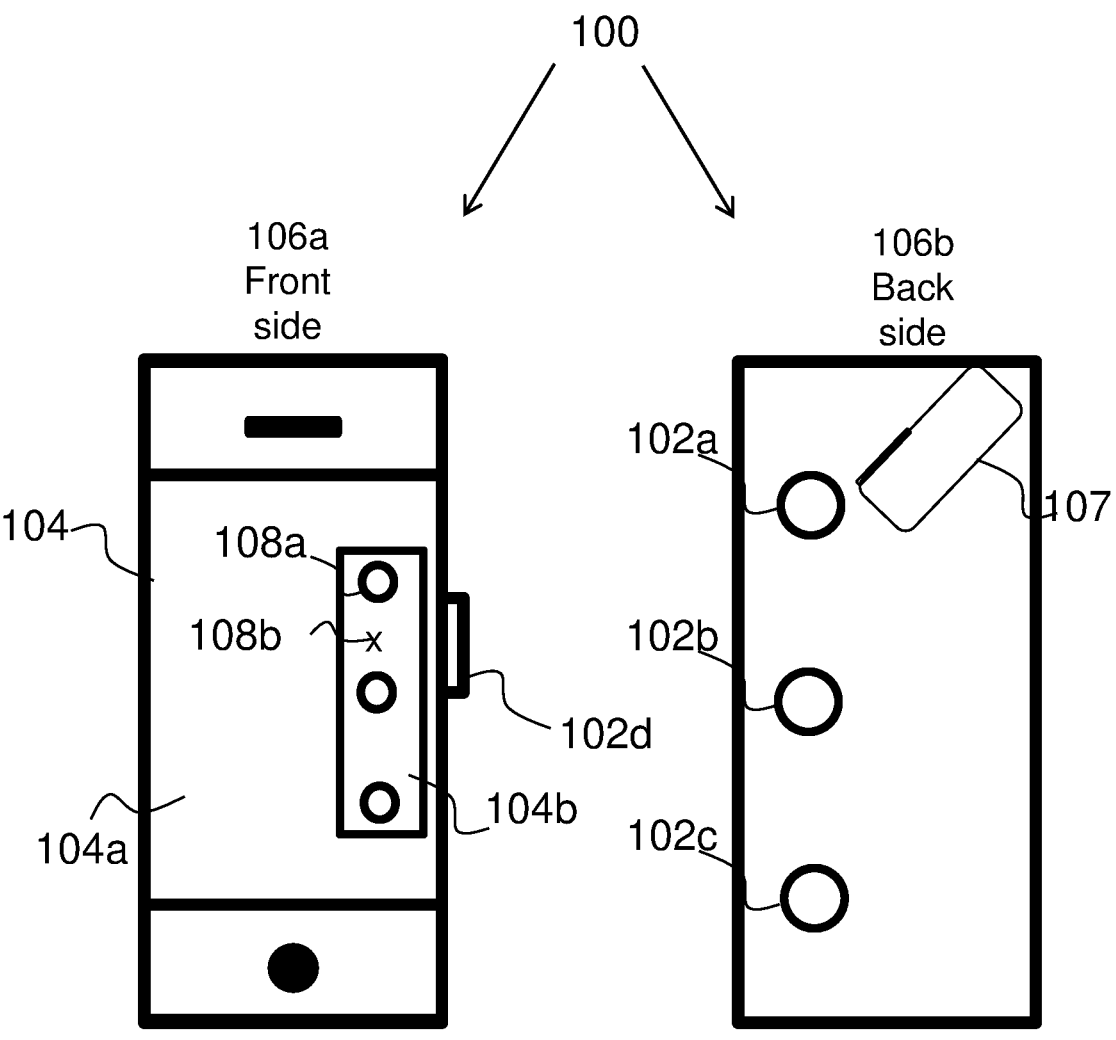
FIG. 1a illustrates exemplifying embodiments of an electronic device.

Embodiments herein relate to electronic devices and their buttons in general. FIG. 1a depicts an electronic device 100 wherein embodiments herein may be implemented. The electronic device 100 may be or comprise any of a mobile phone, a tablet, a TV, a monitor, a headset, electronic eyewear, such as smart glasses, an alarm clock, a car, or a music player. Other examples of implementations of the electronic device 100 are a watch, such as a smart watch, and an augmented or virtual reality headset.

In FIG. 1a the electronic device 100 is illustrated with a mobile phone.

In some embodiments herein the electronic device 100 comprises a touch input arrangement 102a-d, such as one or more physical buttons and/or a touch panel.

Figure 1B:
FIG. 1b illustrates a system block diagram of the electronic device.
Figure 1B:
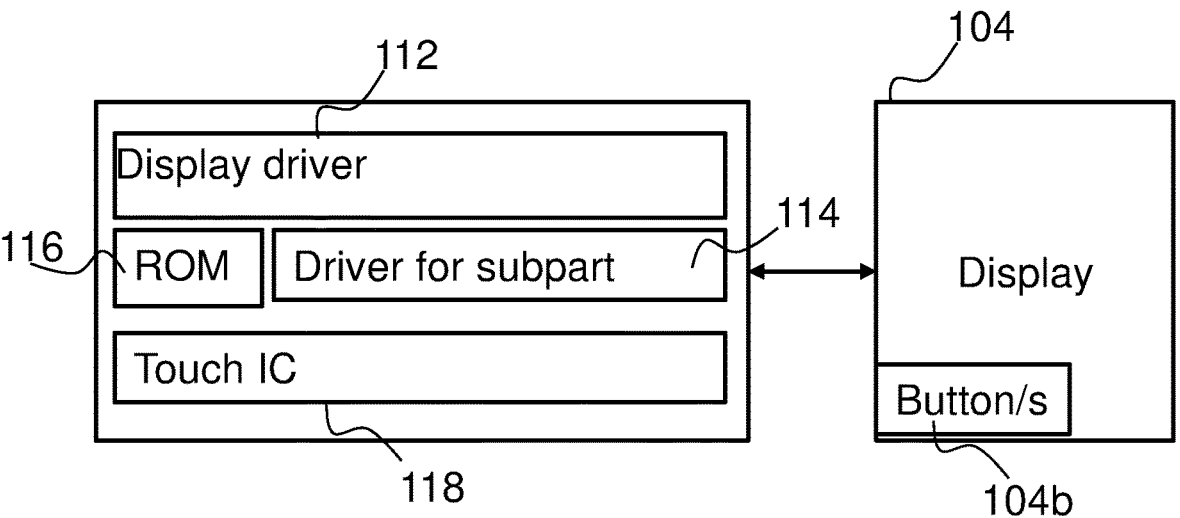

The electronic device 100 comprises a display 104, e.g., arranged on a first surface 106a of the electronic device 100, such as a front side of the electronic device 100 in FIG. 1. The display 104 may comprise a touch panel not shown in FIG. 1a. The display may also be referred to as the screen.

In FIG. 1a a display area 104a of the display 104 is illustrated. The display area 104a may take up a large part, or even all, of the first surface 106a and therefore it may be disadvantageous to arrange buttons on the first surface 106a. In embodiments herein the touch input arrangement 102a-d is arranged outside the display area 104a of the display 104.

In some embodiments herein the touch input arrangement 102a-d may be more or less visually obstructed, e.g., arranged on a surface of the electronic device 100 which usually is not visible when operating the electronic device 100. Thus, the touch input arrangement 102a-d may be arranged on the electronic device 100 such that it is not visible when the display 104 is viewed. As an example, in FIG. 1a a first touch input arrangement 102a, a second touch input arrangement 102b and a third touch input arrangement 102c are arranged on a second surface 106b, such as on a backside, of the electronic device 100. The second surface 106b differs from the first surface 106a. The second surface 106b may face away from the first surface 106a. The second surface 106b may face an opposite direction compared to the first surface 106a.

In other embodiments a fourth touch input arrangement 102d is arranged on the electronic device 100 such that not the entire fourth touch input arrangement 102d is visible, e.g, when viewing the front side. The fourth touch input arrangement 102d may, e.g., be arranged on a side surface of the electronic device 100.

In some embodiments herein the touch input arrangements 102a-d are arranged on a same surface as the display but outside the display area 104a of the display 104. For example, the touch input arrangements 102a-d and the display 104 may form a smooth surface and the touch input arrangements 102a-d may not be visible. Thus, the second surface 106b may be a surface next to the display surface.

FIG. 1a further illustrates an object 107 interacting with the electronic device 100, more specifically with the first touch input arrangement 102a. The object 107 may be a part of a user, such as a finger, or part of a finger.

As mentioned above, if a touch input arrangement 102a-d of the electronic device 100 is not in direct line of sight, e.g., by being located on a headset being worn by a user, and if there are more than one button closely located, said user may need to use his or hers fingers to sense an area around the buttons to make sure the right button is being used. This may be cumbersome to the user and may result in the user interacting with a button which the user didn't intend to interact with. In the end the power consumption of the electronic device may be increased.

Embodiments herein seek to reduce at least some of the problems described above and are directed to a low-power user interface.

Some embodiments herein solve the above-described problems by displaying a graphical representation 108a-b of the touch input arrangement 102a-d and a position of the object 107 relative to the touch input arrangement 102a-d in response to a sensed proximity of the object 107 relative to the touch input arrangement 102a-d.

The above embodiments increase the chances of finding a specific touch input arrangement 102a-d, such as a specific button.

Furthermore, the above embodiments may also remove a need to press a button in order to activate the button and get an indication of what the button is used for since an indication of what the button is used for may be displayed when the object 107, such as the finger of the user, touches or is in proximity of the button.

Further, the electronic device 100 may activate the touch input arrangement 102a-d in response to sensing proximity of the object 107. Activating the touch input arrangement 102a-d may comprise initiating an operation or a function associated with the touch input arrangement 102a-d.

In some further embodiments the display area 104a comprises a sub-display area 104b which is smaller than the display area 104a. Then the electronic device 100 may solve some of the above problems by separately controlling the sub-display area 104b to display information related to the touch input arrangement 102a-d. This may be implemented by including two display drivers in the electronic device 100. A hardware display driver may control incoming data from a host device, such as the electronic device 100, and may keep control of what pre-processing of data that is going to be done and it may also set a drive voltage or drive current for each pixel at each frame.

FIG. 1*b* illustrates a system block diagram of the electronic device 100 comprising two display drivers. Thus, in these embodiments the electronic device 100 comprises a display driver 112 configured to control a respective one of one or more pixels of the display area 104*a* including one or more pixels of the sub-display area 104*b*. In these embodiments the electronic device 100 further comprises a sub-display driver 114 configured to control a respective one of the one or more pixels of the sub-display area 104*b*.

The display driver 112 may control what value is going to be put on each pixel or even on each subpixel on the display 104. For an OLED there is an offset power consumption depending on the size of the display 104 and a linear part depending on how many pixels that are turned on and at what light level.

The sub-display driver 114 controls only a part of the full display 104, such as the sub-display area 104*b* which may be activated in a low power state, to be able to reduce the power consumption of the electronic device 100 e.g., when the electronic device 100 is in standby.

The sub-display driver 114 may be integrated with the display driver 112 or a separate integrated circuit. The pixels of the sub-display area 104*b* that are controlled by both the display driver 112 and the sub-display driver 114 may need to be connected to each display driver.

The sub-display part may have its own memory, such as a read only memory (ROM). In this sub-display memory graphics and information related to the touch input arrangement 102*a-d*, such as text and a menu tree may be stored. Thus, the electronic device 100 may comprise a memory 116 comprising the information related to the touch input arrangement 102*a-d* and configured for use only for the sub-display area 104*b*. The memory 116 may also be part of a bigger memory. Then before the display 104 is shut down the sub-display memory parts may be added. If a host display device is operable with different button devices, then different menus that may be activated for the different button devices may need to be stored.

The detection of touch or proximity may be implemented, at least partly, with a touch integrated circuit (IC) 118 which may be a low power solution. For example, a proximity detection algorithm running in the touch IC 118 may go down to tens of micro watts in power consumption. Therefore, the touch IC 118 may be running continuously. Thus, in some embodiments herein the touch IC 118 may be always on. The touch IC 118 may also be referred to as a touch panel IC. The electronic device 100 may comprise touch IC 118.

In some embodiments the memory 116 is integrated in the touch IC 118 or in close proximity to the touch IC 118, e.g., for low power usage. By having a separate sub-display memory no other part of the display system needs to be turned on when the sub-display part is active. Depending on the content, the memory 116 may need to have different size.

These embodiments enable visibility of the touch input arrangements 102*a-d*, such as buttons, even when the display 104 is in standby mode. Some embodiments include a zero-force activation feature make it easier for the user. For example, the same button may have multiple functions: zero-force activation may change position in a menu and pressing a mechanical switch may activate a function in the menu.

An advantage of the sub-display driver 114 and the memory 116 is that other parts of the electronic device 100 do need to be turned on.

These embodiments also provide a hardware solution where the display 104 may be partially turned on, and be ready to provide information about different buttons.

An advantage is that the electronic device 100 enables a user to find the touch input arrangements 102*a-d* even though the display 104 is in standby. This is also a good way of changing settings without having to turn on the entire display 104 or the host device or host system, such as the electronic device 100.

The display 104 may be of different technologies such as Organic LED (OLED), LCD, MicroLED or other display technologies. It can be noted that OLED, MicroLED and other emissive display technologies may have an advantage as they only need to activate a small part 104*b* of the display 104 that is going to be active. Transflective and reflective type of displays also provide this advantage but they are not commonly used today.

Transmissive displays, such as Liquid Crystal Displays (LCD), are displays that need a separate backlight unit to be able to show any information. For transmissive displays the backlight commonly needs to be turned on even when a small part 104*b* of the display 104 is activated. Transmissive displays are the main technology used today in TVs, monitors, smartphones etc. The trend is pointing towards that transmissive displays will be replaced by OLED displays in the future.

For the ease of explanation, embodiments herein may be exemplified with an OLED display.

In some embodiments herein the display 104 is arranged on a separate display device such as a smartphone, tablet, or smart watch. An advantage of this is that the device comprising the input arrangement 102*a-d* does not need to have a display or does not need to turn on its display.

Figure 2:
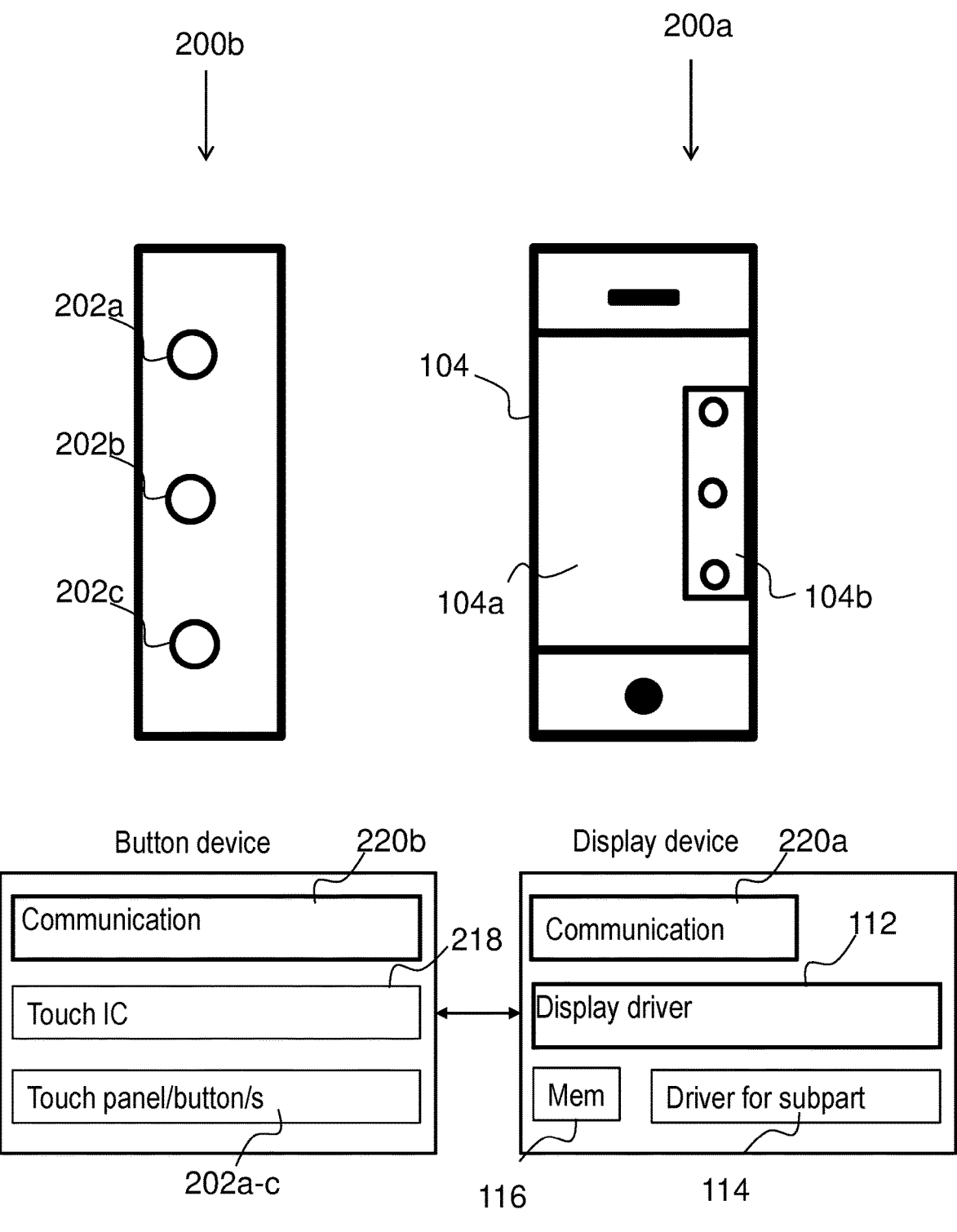
FIG. 2 illustrates exemplifying embodiments of a first electronic device and a second electronic device.

FIG. 2 depicts a first electronic device 200*a*, such as a display device and a second electronic device 200*b*, such as a button device, wherein embodiments herein may be implemented. The first electronic device 200*a* may be a mobile phone and the second electronic device 200*b* may be an associated headset.

In some embodiments herein the second electronic device 200*b* comprises one or more touch input arrangements 202*a-c*, such as one or more physical buttons and/or a touch panel.

The first electronic device 200*a* comprises the display 104 comprising the display area 104*a* which in turn may comprise the sub-display area 104*b* which is smaller than the display area 104*a*.

FIG. 2 further illustrates a system block diagram of the first electronic device 200*a* and the second electronic device 200*b*.

The second electronic device 200*b* may comprise a touch IC 218 which may, by some second communications means 220*b* in the second electronic device 200*b* and some first communications means 220*a* in the first electronic device 200*a*, trigger the display driver 112 or the sub-display driver 114 of the first electronic device 200*a* to display information related to the touch input arrangements 202*a-c*. The first electronic device 200*a* may further comprise the memory 116.

The memory 116 may be writeable for the display driver 112 and/or the sub-display driver 114 so that an application in the display device 200*a* may write appropriate data in the memory 116 as this will vary depending on what button device 200*b* that is connected to the display device 200*a*.

The communication between the button device 200*b* and the display device 200*a* may be radio based and could use various different interface protocols such as Bluetooth, Zigbee, Z-wave, Wi-Fi, and cellular to mention a few. The devices may be paired, and the button device may have privileges to wake up the display device.

Figure 3:
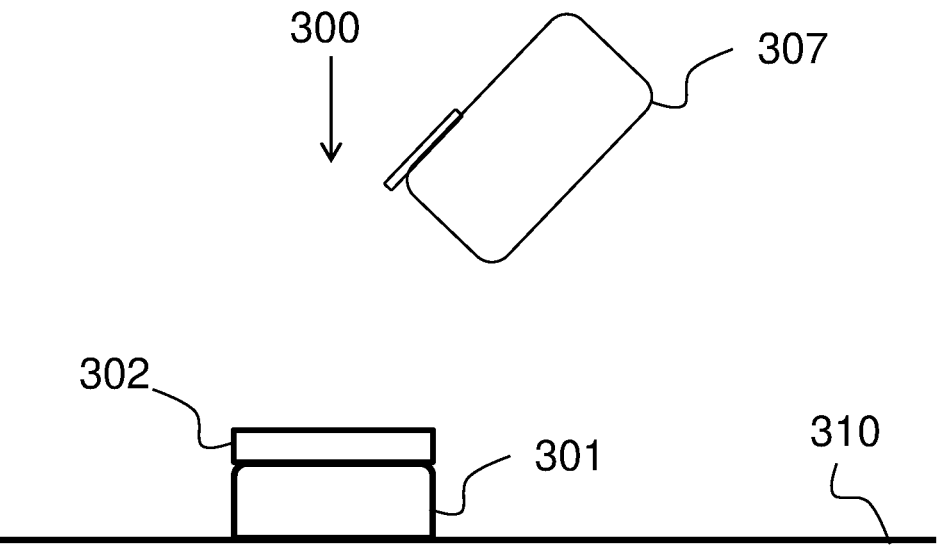
FIG. 3 illustrates exemplifying embodiments of a button.

FIG. 3 depicts details of the touch input arrangement 102a-d of the electronic device 100, 200 according to some embodiments herein.

In FIG. 3 the touch input arrangement comprises a button 300. The button 300 may comprise a mechanical switch actuator 301. The mechanical switch actuator 301 may be used for triggering a function related to the button 300.

The mechanical switch actuator 301 may comprise a collapsible mechanical structure. For example, the mechanical switch actuator 301 may comprise a dome switch actuator. Such mechanical switches provides both tactile feedback and function activation/triggering in a single button. For example, the mechanical switch actuator 301 may provide push haptic sensation and function activation. The activation of the function is triggered by a collapse of the mechanical switch actuator 301 due to a physical press, e.g., by the user.

The touch input arrangement 102a-d may further comprise a proximity sensor 302 for sensing proximity of the object 107, 307 interacting with the touch input arrangement 102a-d, 202a-c. The proximity sensor 302 may be configured to sense proximity of the object 107, 307 relative to the touch input arrangement 102a-d, 202a-c. The proximity sensor 302 may be connected to the touch IC 118. The touch IC 118 may control the proximity sensor 302. The touch IC 118 may further convert output from the proximity sensor 302 into signals that can be used by other parts of the electronic device 100, such as the sub-display driver 114.

In some embodiments herein the touch input arrangement 102a-c, 202a-c and the proximity sensor 302 configured to sense proximity of the object 107, 307 relative to the touch input arrangement 102a-c are comprised in the second electronic device 200b.

The proximity sensor 302 may be an electromagnetic sensor such as a capacitive sensor. For example, the button 300 may comprise the proximity sensor 302.

In some embodiments, the mechanical switch actuator 301 may be integrated with a capacitive switch overlay. The button 300 may alternatively be a capacitive button with no physical feedback. Thus, the touch input arrangement 102a-d, 202a-c may comprise a capacitive sensor 302 configured to sense proximity of the object 303 relative to the touch input arrangement 102a-d, 202a-c.

The proximity sensor 302 allows to sense when the object 303 is touching or nearby the button 300. The proximity sensor 302 may be activated with zero-force touch. A zero-force touch sensor is able to register a touch without pressure and convert that touch into an electrical output that initiates an operation or a function. Thus, activating the proximity sensor 302 may comprise initiating the operation or the function.

In some further embodiments herein the button 300 comprises a layered structure and the proximity sensor 302 is comprised in a second layer while a first layer comprises the mechanical switch actuator 301. The second layer may be arranged on top of the first layer with respect to a surface 310 of the electronic device 100.

In some further embodiments herein the proximity sensor 302 is at least partly not covered by a conductive material. For example, a capacitive sensing region of the capacitive sensor may not be covered fully by a conductive material. Thus, in some embodiments herein the proximity sensor 302 is at least partly not covered by a conductive material on a sensing side of the proximity sensor 302.

Exemplifying embodiments herein will now be described with reference to FIG. 4a and with further reference to FIGS. 1, 2 and 3. In these embodiments the display area 104a does not necessarily comprise the sub-display area 104b and the electronic device 100 does not necessarily comprise the sub-display driver 114.

Figure 4A:
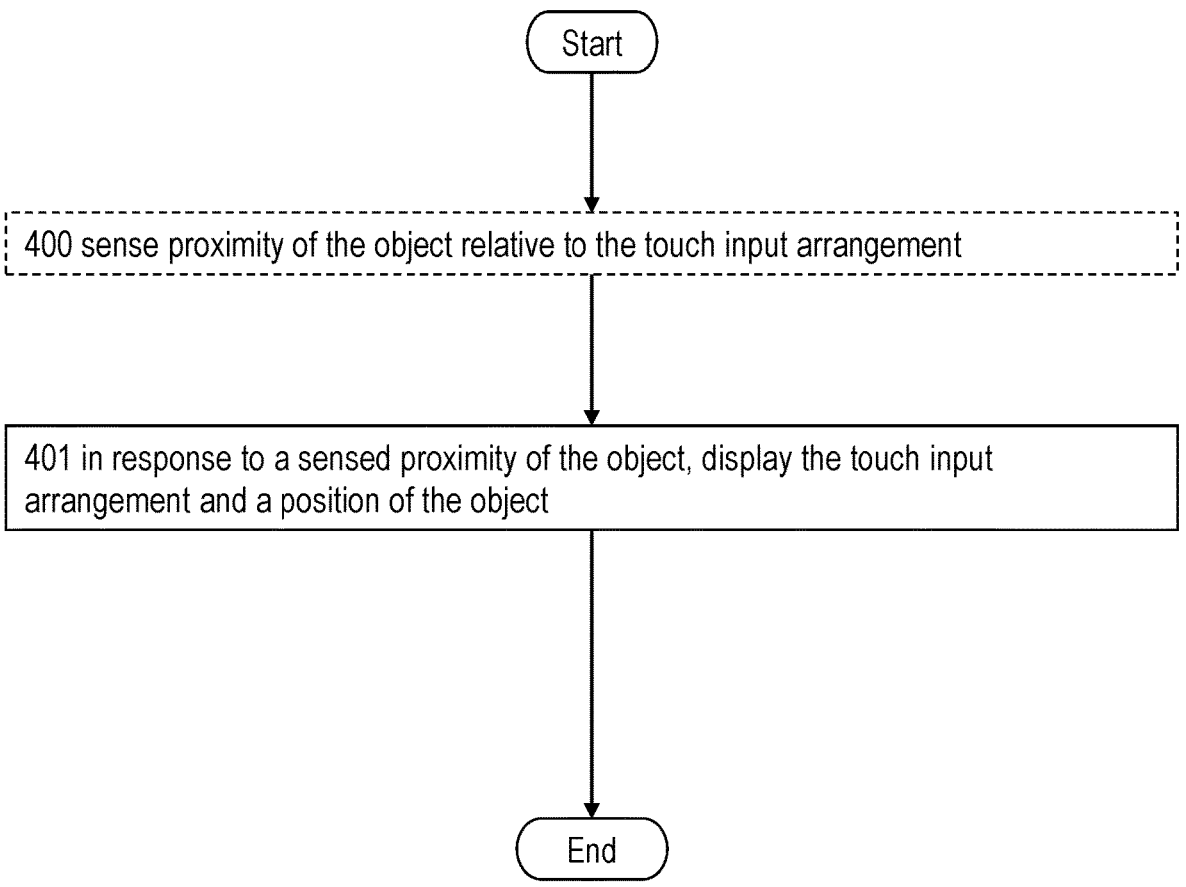
FIG. 4a is a flowchart illustrating embodiments of a method performed by an electronic device.

FIG. 4a illustrates a flowchart describing a method, performed by the electronic device 100, for generating feedback related to the interaction with the touch input arrangement 102a-d.

One or more of the following actions presented in FIG. 4a may be performed in the following exemplifying order. In other examples, the order may differ from what is described below.

Action 400

In some embodiments, wherein the electronic device 100 comprises the proximity sensor 302, the electronic device 100 senses proximity of the object 107, 307 relative to the touch input arrangement 102a-d with the proximity sensor 302. The electronic device 100 may sense proximity of the object 107, 307 in order to display information related to the touch input arrangement 102a-d before the touch input arrangement 102a-d is interacted with, or at least before the touch input arrangement 102a-d activates a function of the electronic device 100.

For example, when the object 107, 307, such as a finger, is approaching the proximity of the touch input arrangement 102a-d, such as buttons on the backside of the electronic device 100, the touch IC 118 may notice the conductive material and trigger the display 104 to display the information. Triggering the display 104 may comprise triggering the sub-display driver 114 of the electronic device 100.

Action 401

In response to a sensed proximity of the object 107 relative to the touch input arrangement 102a-d, the electronic device 100 displays on the display 104 a graphical representation 108a-b of the touch input arrangement 102a-d and a position of the object 107 relative to the touch input arrangement 102a-d.

In some embodiments herein the touch input arrangement 102a-d comprises multiple touch input arrangements 102a-d. If proximity is sensed for the first touch input arrangement 102a then the electronic device 100 may display a graphical representation 108a-b of a first touch input arrangement 102a out of the multiple touch input arrangements 102a-d and the position of the object 107 relative to the first touch input arrangement 102a.

In other words, displaying the graphical representation 108a-b of the touch input arrangement 102a-d and the position of the object 103 relative to the touch input arrangement 102a-d may comprise displaying the graphical representation 108a-b of the first touch input arrangement 102a out of the multiple touch input arrangements 102a-d and the position of the object 107 relative to the first touch input arrangement 102a, for which first touch input arrangement 102a proximity is sensed.

Exemplifying embodiments herein will now be described with reference to FIG. 4b and with further reference to FIGS. 1, 2 and 3. FIG. 4b illustrates a further flowchart describing a further method, performed by the electronic device 100, for generating feedback related to the interaction with the touch input arrangement 102a-d.

In these embodiments the display area 104a comprises the sub-display area 104b and the electronic device 100 comprises both the display driver 112 and the sub-display driver

114. As mentioned above, the touch input arrangement 102*a-d* is arranged outside the display area 104*a* of the display 104.

One or more of the following actions presented in FIG. 4*b* may be performed in the following exemplifying order. In other examples, the order may differ from what is described below. The actions of FIG. 4*b* may also be combined with the actions of FIG. 4*a*.

Action 409

When the electronic device 100 comprises the touch input arrangement 102*a-d* and the proximity sensor 302, the electronic device 100 may further sense proximity of the object 107, 307 relative to the touch input arrangement 102*a-d* with the proximity sensor 302. As mentioned above, the proximity sensor 302 may be comprised in the touch input arrangement 102*a-d*, 303.

Action 410*a*

In some embodiments herein the electronic device 100 activates the sub-display area 104*b* in response to the sensed proximity of the object 107 relative to the touch input arrangement 102*a-d*.

Action 410*b*

The electronic device 100 may also activate the touch input arrangement 102*a-d* in response to the sensed proximity of the object 107 relative to the touch input arrangement 102*a-d*.

Action 411

The sub-display driver 114 controls the one or more pixels of the sub-display area 104*b* to display information related to the touch input arrangement 102*a-d* in response to a sensed proximity of the object 107 relative to the touch input arrangement 102*a-d*.

In some embodiments herein the sub-display driver 114 controls the one or more pixels of the sub-display area 104*b* to display information related to the touch input arrangement 102*a-d* while the display driver 112 is off.

In other words, the sub-display driver 114 controls the one or more pixels of the sub-display area 104*b* to display information related to the touch input arrangement 102*a-d* while the display driver 112 controls pixels in parts of the display 104 outside the sub-display area 104*b* to be off. That is, the sub-display driver 114 may be active while the display driver 112 is inactive. Since the display driver 112 is off the rest of the display 104 outside the sub-display area 104*b* will also be off.

As mentioned above when describing the method of FIG. 4*a*, the information related to the touch input arrangement 102*a-d* may comprises the graphical representation 108*a-b* of the touch input arrangement 102*a-d* and the position of the object 107 relative to the touch input arrangement 102*a-d*.

When the touch input arrangement 102*a-d* comprises multiple touch input arrangements 102*a-d*, then the information related to the touch input arrangement 102*a-d* may comprise information related to a first touch input arrangement 102*a* out of the multiple touch input arrangements 102*a-d* for which first touch input arrangement 102*a* proximity is sensed.

Action 415

In some embodiments herein the electronic device 100 de-activates the sub-display and/or the touch input arrangement 102*a-d* in response to a sensed removal of the object 107 from the proximity of the touch input arrangement 102*a-d*.

FURTHER EXAMPLES

Figure 5A:
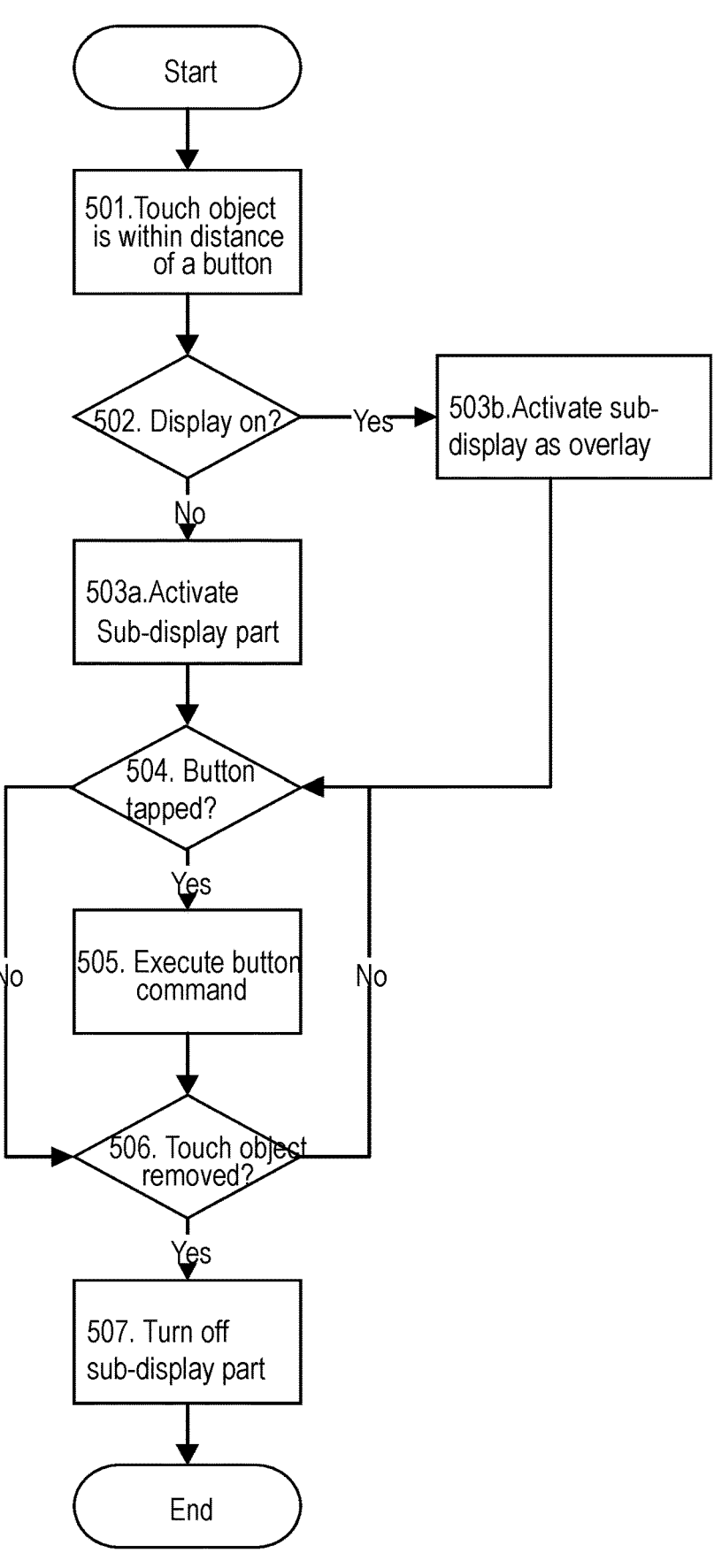
FIG. 5a is a flowchart illustrating embodiments of a further method performed by an electronic device.

Exemplifying embodiments herein will now be described with reference to FIG. 5*a* and with further reference to FIGS.

1, 2 and 3. FIG. 5*a* illustrates a further flowchart describing a further method, performed by the electronic device 100, for generating feedback related to the interaction with the touch input arrangement 102*a-d*.

One or more of the following actions presented in FIG. 5*a* may be performed in the following exemplifying order. In other examples, the order may differ from what is described below.

Action 501

In some embodiments herein, when the object 107, 307, such as a finger, is approaching the proximity of the touch input arrangement 102*a-d*, such as buttons on the backside of the electronic device 100, the touch IC 118 may notice the conductive material and trigger the display to display the information. Triggering the display 104 may comprise triggering the sub-display driver 114 of the electronic device 100.

The four touch input arrangements 102*a-d* of FIG. 1*a* may be displayed with different text or graphics.

If the displayed picture is just in front of the touch input arrangements 102*a-d*, then it is easy to understand where the touch input arrangement 102*a-d* are located and which touch input arrangement 102*a-d* is which. If not, a position of the finger may be shown in relation to the layout of the touch input arrangements 102*a-d* shown. In an alternative embodiment, only the touch input arrangement 102*a-d* being touched or close to the finger is shown on the display with its name or an explanation of which function it is associated with, in case it is not obvious from the name.

In some other embodiments herein the proximity sensing can be done by radar technology.

In yet another embodiment, the radar technology is also available in the electronic device 100 for gesture recognition. Then proximity detection or touch may activate the sub-display driver 114 to display in a very energy-efficient way input gestures that are available or enabled, and as the user makes the gestures the electronic device 100 may provide feedback on whether those are recognized or not. This may be relevant also when the first electronic device 100*a* comprising the display 104 is paired and with the second electronic device 200*b* comprising the touch input arrangement 102*a-d*, such as the headset comprising buttons for volume control.

Action 502

The electronic device 100 checks whether or not the display 104 is on.

Action 503*a*

If the display 104 is turned off the sub-display driver 114 may light only a small part of the display 104 which may show the touch input arrangement 102*a-d* for which proximity of the object 107, 307 is sensed, e.g., that the user would like to use. The small part of the display 104, such as the sub-display area 104*b*, may be connected to the touch input arrangement 102*a-d*.

Action 503*b*

If the display 104 is turned on when the object 107, 307 is in proximity of the touch input arrangement 102*a-d* then the touch input arrangement 102*a-d* may be displayed on a sub-display, e.g., corresponding to the sub-display area 104*b*, as an overlay on the existing content on the display 104.

Action 504

Once the sub-display part of the display 104 is active the touch input arrangement 102*a-d* may be pressed or tapped depending what solution that has been selected, e.g., a pure capacitive touch solution or a dome switch solution.

Action 505

Once the touch input arrangement 102a-d is pressed and/or tapped a command may be executed and the electronic device 100 will behave accordingly. If necessary, a menu may be updated with text and graphics from the memory 116. The electronic device 100 may go back to a mode in which it senses whether or not the touch input arrangement 102a-d has been touched and/or pressed (e.g. a button listening mode), and wait for a next command.

Action 506

The electronic device 100 may then check whether or not the object 107, 307 is removed from the proximity of the touch input arrangement 102a-d.

Action 507

Once the object 107, 307 is removed from the proximity of the touch input arrangement 102a-d the sub-display driver 114 may turn off the sub-display part 104b and put the touch IC 118 back in a low power mode. In the low power mode the touch IC 118 may have different sensor settings than in an activated mode, such as after the touch IC has been activated by the sensed proximity. Such sensor settings may comprise frequency of scans, signal strength and signal threshold.

Figure 5B:
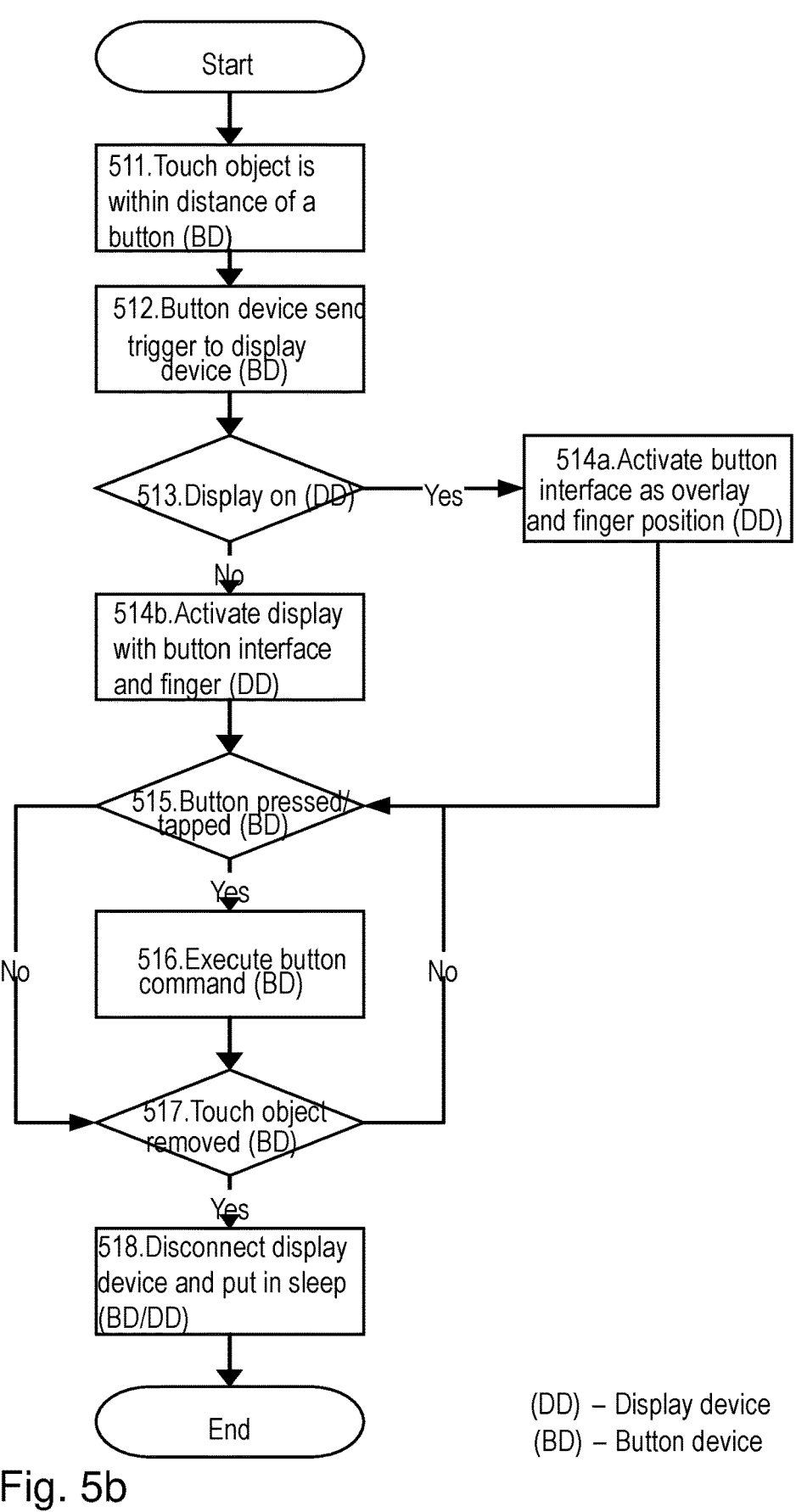
FIG. 5b is a flowchart illustrating embodiments of a further method performed by one or more electronic devices, such as a button device and a display device.

Exemplifying embodiments herein will now be described with reference to FIG. 5b and with further reference to FIGS. 1a, 1b, 2 and 3. FIG. 5b illustrates a further flowchart describing a method, performed by the first electronic device 200a and the second electronic device 200b, for generating feedback related to the interaction with the touch input arrangement 102a-d comprised in the second electronic device 200b. The second electronic device 202b has been described above in relation to FIG. 2. As mentioned above, the first electronic device 202a comprises the display 104 and may also be referred to as the display device, while the second electronic device 200b may be referred to as the button device.

One or more of the following actions presented in FIG. 5b may be performed in the following exemplifying order. In other examples, the order may differ from what is described below.

Action 511

In some embodiments herein, the touch object 107, 307 is within distance of a touch input arrangement 202a-c of the second electronic device 200b, e.g., within a distance of a button on the button device.

Action 512

The touch IC 218 of the second electronic device 200b may notice the touch object 307, such as a finger, e.g., by sensing a conductive material of the touch object 307, and trigger the display 104 of the first electronic device 200a to display information related to the touch input arrangement 202a-c of the second electronic device 200b. Triggering the display 104 may comprise triggering a signal from the button device 200b to the display device 200a to start the display 104 of the display device 200a.

Action 513

The first electronic device 200a checks whether or not display 104 is on.

Action 514a

Either the first electronic device 200a has the feature with a subpart of the display 104 being activated or all of the display 104 may be turned on.

If the display 104 is turned off the sub-display driver 114 may light only a small part of the display 104 that is connected to the touch input arrangement 102a-d for which proximity of the object 107, 307 is sensed, e.g., that the user would like to use.

Action 514b

If the display 104 is turned on when the object 107, 307 is in proximity of the touch input arrangement 102a-d then the touch input arrangement 102a-d may be displayed on a sub-display, e.g., corresponding to the sub-display area 104b, as an overlay on the existing content on the display 104. The first electronic device 200a may also show a position of the object 107, 307 in relation to the position of the touch input arrangement 102a-d. The position of the object 107, 307 may continuously be transferred from the button device 200b to the first electronic device 200a. If the display 104 only displays information related to the touch input arrangement 102a-d being close to the object 107, 307 or being touched by the object 107, 307, then it is not needed to show the position of the object 107, 307 specifically.

Action 515

Once the sub-display part of the display 104 is active the touch input arrangement 102a-d may be pressed or tapped depending what solution that has been selected, e.g., a pure capacitive touch solution or a dome switch solution.

Action 516

Once the touch input arrangement 102a-d is pressed and/or tapped a command may be executed and the electronic device 100 will behave accordingly. If necessary, a menu may be updated with text and graphics from the memory 116. The electronic device 100 may go back to a mode in which it senses whether or not the touch input arrangement 102a-d has been touched and/or pressed (e.g. a button listening mode), and wait for a next command.

Action 517

The second electronic device 200b may then check whether or not the object 107, 307 is removed from the proximity of the touch input arrangement 102a-d.

Action 518

Once the interaction with the touch input arrangement 102a-d is done a communication channel may be shut down between the button device 200b and the display device 200a and then the display device 200a may go into sleep mode. Thus, once the object 107, 307 is removed from the proximity of the touch input arrangement 102a-d the sub-display driver 114 may turn off the sub-display part 104b and put the touch IC 118, 218 back in a low power mode.

In another embodiment the display device may also receive the touch input. For example, the object 107, 307 activates the buttons on the button device which triggers an establishment of a connection with the display device. Then the button device menu may be shown on the display device. As long as the display device displays the buttons of the button device all further interactions with the display device and/or the button device are done through the display device, e.g. by interacting with a touch panel integrated with the display.

Figure 6:
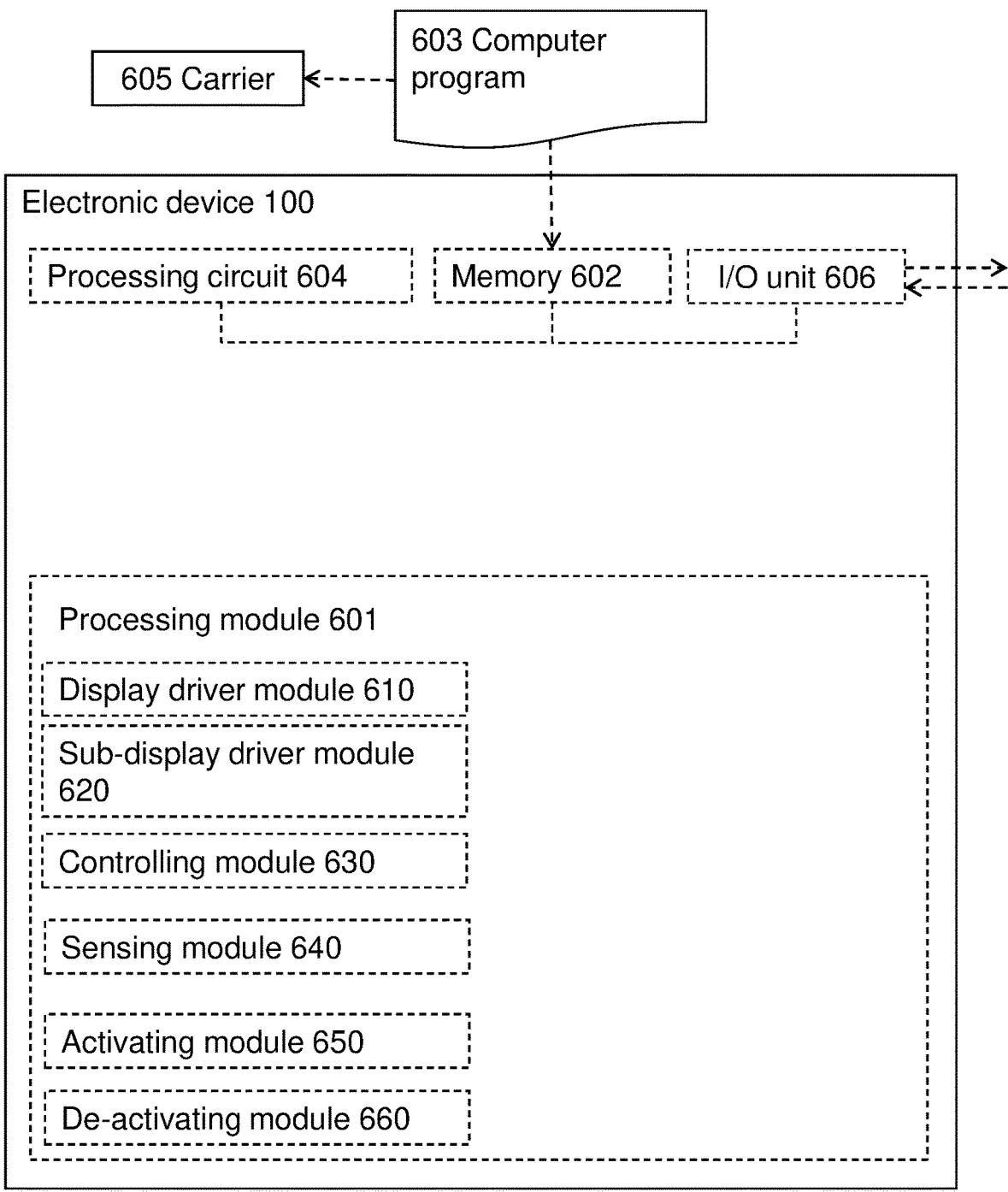
FIG. 6 is a block diagram illustrating embodiments of the electronic device.

FIG. 6 illustrates a schematic block diagram of embodiments of the electronic device 100.

The electronic device 100 may comprise a processing module 601 for performing the above method actions. The processing module 601 may comprise a display driver module 610 to, e.g., display content on the display 104 and/or control pixels of the display area 104a. The processing module 601 may comprise a sub-display driver module 620 to, e.g., display on the sub-display area 104b and/or control pixels of the sub-display area 104b. The processing module 601 may further comprise a controlling module 630 to, e.g. control pixels of the sub-display area 104b. The processing module 601 may comprise a sensing module 640 to, e.g. sense proximity of the object 107. The processing module 601 may comprise an activating module 650 to e.g. activate the sub-display area 104b, or to activate the touch-input arrangement 102*a-d*. The processing module 601 may comprise a de-activating module 660 to, e.g. de-activate the sub-display area 104*b*.

In some embodiments, e.g., to perform the actions 400-401 above, the electronic device 100 is configured to, e.g. by means of the display driver module 610, in response to a sensed proximity of an object 107 relative to the touch input arrangement 102*a-d*, display on the display 104 a graphical representation 108*a-b* of the touch input arrangement 102*a-d* and a position of the object 107 relative to the touch input arrangement 102*a-d*.

The electronic device 100 may further be configured to, e.g., by means of the sensing module 640, sense proximity of the object 107, 307 relative to the touch input arrangement 102*a-d*, 300 with a proximity sensor 302.

In some of these embodiments, the display 104 is arranged on a first surface 106*a* of the electronic device 100 and the touch input arrangement 102*a-d* is arranged on a second surface 106*b* of the electronic device 100 which second surface 100 differs from the first surface 106*a*.

In some of these embodiments, wherein the touch input arrangement 102*a-d* is arranged on the electronic device 100 such that it is not visible when the display 104 is viewed.

In some of these embodiments, the touch input arrangement 102*a-d*, and a proximity sensor 302 configured to sense proximity of the object 303 relative to the touch input arrangement 102*a-d* are arranged to be comprised in a second electronic device 200.

In some of these embodiments, the touch input arrangement 102*a-d* is adapted to comprise a capacitive sensor 302 configured to, e.g. by means of the sensing module 640, sense proximity of the object 303 relative to the touch input arrangement 102*a-d*.

In some of these embodiments, the touch input arrangement 102*a-d* is adapted to comprise a button 300.

In some of these embodiments, the touch input arrangement 102*a-d* is adapted to comprise multiple touch input arrangements 102*a-d*, and wherein the electronic device 100 is configured to, e.g. by means of the display driver module 610, display the graphical representation 108*a-b* of the touch input arrangement 102*a-d* and the position of the object 103 relative to the touch input arrangement 102*a-d* by displaying a graphical representation 108*a-b* of a first touch input arrangement 102*a* out of the multiple touch input arrangements 102*a-d* and the position of the object 107 relative to the first touch input arrangement 102*a*, for which first touch input arrangement 102*a* proximity is to be sensed.

In some other embodiments, e.g., to perform the method Actions 409-415 above, the electronic device 100 may be configured to generate feedback related to an interaction with a touch input arrangement 102*a-d*. The electronic device 100 comprises:

The display 104 comprising a display area 104*a*, wherein the display area 104*a* comprises a sub-display area 104*b* which is smaller than the display area 104*a;* the display driver 112 configured to, e.g. by means of the controlling module 630, control a respective one of one or more pixels of the display area 104*a* including one or more pixels of the sub-display area 104*b*; and the sub-display driver 114 configured to, e.g. by means of the controlling module 630, control the respective one of the one or more pixels of the sub-display area 104*b*. The touch input arrangement 102*a-d* is arranged outside the display area 104*a* of the display 104.

The electronic device 100 may further be configured to, e.g., by means of the sub-display driver 114 and/or the controlling module 630, control the one or more pixels of the sub-display area 104*b* to display information related to the touch input arrangement 102*a-d* in response to the sensed proximity of the object 107 relative to the touch input arrangement 102*a-d*.

The electronic device 100 may further be configured to, e.g., by means of the activating module 650 and/or the sub-display driver 114, activate the sub-display area 104*b* in response to the sensed proximity of the object 107 relative to the touch input arrangement 102*a-d*.

The electronic device 100 may further be configured to, e.g., by means of the activating module 650, activate the touch input arrangement 102*a-d* in response to the sensed proximity of the object 107 relative to the touch input arrangement 102*a-d*.

The electronic device 100 may further be configured to, e.g., by means of the de-activating module 660, de-activate the sub-display and/or the touch input arrangement 102*a-d* in response to a sensed removal of the object 107 from the proximity of the touch input arrangement 102*a-d*.

In some of these embodiments the electronic device 100 is adapted to comprise a memory 116, integrated or in close proximity of the touch input arrangement 102*a-d*, wherein the memory 116 is adapted to comprise the information related to the touch input arrangement 102*a-d* and configured for use only for the sub-display area 104*b*.

In some of these embodiments the touch input arrangement 102*a-d* is adapted to comprise a proximity sensor 302 configured to sense proximity of the object relative to the touch input arrangement 102*a-d*.

In some of these embodiments the electronic device 100 is adapted to comprise the touch input arrangement 102*a-d* and the proximity sensor 302, the electronic device 100 further being configured to, e.g., by means of the sensing module 640, sense proximity of the object relative to the touch input arrangement 102*a-d* with the proximity sensor 302.

In some of these embodiments the information related to the touch input arrangement 102*a-d* is adapted to comprise a graphical representation 108*a-b* of the touch input arrangement 102*a-d* and a position of the object 107 relative to the touch input arrangement 102*a-d*.

In some of these embodiments the display 104 is arranged on a first surface 106*a* of the electronic device 100 and the touch input arrangement 102*a-d* is arranged on a second surface 106*b* which differs from the first surface 106*b*.

In some of these embodiments the touch input arrangement 102*a-d* is arranged on the electronic device 100 such that it is not visible when the display 104 is viewed.

In some of these embodiments the touch input arrangement 102*a-d* is adapted to comprise a capacitive sensor 302.

In some of these embodiments the touch input arrangement 102*a-d* is adapted to comprise multiple touch input arrangements 102*a-d*, and wherein the information related to the touch input arrangement 102*a-d* comprises information related to a first touch input arrangement 102*a* out of the multiple touch input arrangements 102*a-d* for which first touch input arrangement 102*a* proximity is to be sensed.

In some of these embodiments the touch input arrangement 102*a-d* and a proximity sensor 302 configured to sense proximity of the object 107 relative to the touch input arrangement 102*a-d* are arranged to be comprised in a second electronic device 200*b*.

In some of these embodiments the touch input arrangement 102*a-d* is adapted to comprise a button 300.

In some of these embodiments the sub-display driver 114 is adapted to e.g., by means of the controlling module 630, control the one or more pixels of the sub-display area 104*b* to display information related to the touch input arrangement 102a-d while the display driver 112 is off.

In some of these embodiments the electronic device 100 is adapted to be any of a mobile phone, a tablet, a TV, a monitor, electronic eyewear, a headset, an alarm clock, a car, and a music player.

The embodiments herein may be implemented through a processing circuit 604, e.g. comprising one or more processors, in the electronic device 100 depicted in FIG. 6, together with computer program code, e.g. computer program 603, for performing the functions and actions of the embodiments herein. The program code mentioned above may also be provided as a computer program product, for instance in the form of a data carrier carrying computer program code for performing the embodiments herein when being loaded into the electronic device 100. One such carrier may be in the form of a CD ROM disc. It is however feasible with other data carriers such as a memory stick. The computer program code may furthermore be provided as pure program code on a server and downloaded to the electronic device 100.

The electronic device 100 may further comprise a memory 602 comprising one or more memory units. The memory 602 comprises instructions executable by the processing circuit in the electronic device 100. The memory 602 is arranged to be used to store e.g. information, indications, data, configurations, and applications to perform the methods herein when being executed in the electronic device 100.

In some embodiments, a computer program 603 comprises instructions, which when executed by the processing circuit 604, cause the processing circuit 604 of the electronic device 100 to perform any of the method actions above.

In some embodiments, a carrier 604 comprises the respective computer program 603, wherein the carrier 604 is one of an electronic signal, an optical signal, an electromagnetic signal, a magnetic signal, an electric signal, a radio signal, a microwave signal, or a computer-readable storage medium.

To perform the method actions above, the electronic device 100 may further comprise an Input and Output (I/O) unit 606. The I/O unit 606 may be part of a user interface and may comprise or be configured to communicate with e.g., the display 104, the touch input arrangement 102a-d and the proximity sensor 302.

Those skilled in the art will appreciate that the modules and/or units in the electronic device 100 described above may refer to a combination of analog and digital circuits, and/or one or more processors configured with software and/or firmware, e.g. stored in the electronic device 100, that when executed by, e.g., the processing circuit 601, above causes the electronic device to perform the method actions above. The processing circuit 601, as well as the other digital hardware, may be included in a single Application-Specific Integrated Circuitry (ASIC), or several processors and various digital hardware may be distributed among several separate components, whether individually packaged or assembled into a system-on-a-chip (SoC).

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a connecting means, providing means, configuring means, responding means, disabling means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an electronic device, for generating feedback related to an interaction with a touch input arrangement, wherein the electronic device comprises:

a display comprising a display area, wherein the display area comprises a sub-display area which is smaller than the display area;

a display driver configured to control a respective one of one or more pixels of the display area including one or more pixels of the sub-display area; and a sub-display driver configured to control the respective one of the one or more pixels of the sub-display area;

wherein the touch input arrangement is arranged outside the display area of the display, and wherein the method comprises:

in response to a sensed proximity of an object relative to the touch input arrangement, controlling, by the sub-display driver, the one or more pixels of the sub-display area to display information related to the touch input arrangement, and activating the sub-display area, independently of the remainder of the display area, in response to the sensed proximity of the object relative to the touch input arrangement.

2. The method according to claim 1, further comprising activating the touch input arrangement in response to the sensed proximity of the object relative to the touch input arrangement.

3. The method according to claim 1, further comprising de-activating the sub-display and/or the touch input arrangement in response to a sensed removal of the object from the proximity of the touch input arrangement.

4. The method according to claim 1, wherein the electronic device comprises a memory, integrated or in close proximity of the touch input arrangement, comprising the information related to the touch input arrangement and configured for use only for the sub-display area.

5. The method according to claim 1, wherein the touch input arrangement comprises a proximity sensor configured to sense proximity of the object relative to the touch input arrangement.

6. The method according to claim 1, wherein the electronic device comprises the touch input arrangement and the proximity sensor, the method further comprising sensing proximity of the object relative to the touch input arrangement with the proximity sensor.

7. The method according to claim 1, wherein the information related to the touch input arrangement comprises a graphical representation of the touch input arrangement and a position of the object relative to the touch input arrangement.

8. The method according to claim 1, wherein the display is arranged on a first surface of the electronic device and the touch input arrangement is arranged on a second surface which differs from the first surface.

9. The method according to claim 1, wherein the touch input arrangement is arranged on the electronic device such that it is not visible when the display is viewed.

10. The method according to claim 1, wherein the touch input arrangement comprises a capacitive sensor.

11. The method according to claim 1, wherein the touch input arrangement comprises multiple touch input arrangements, and wherein the information related to the touch input arrangement comprises information related to a first touch input arrangement out of the multiple touch input arrangements for which first touch input arrangement proximity is sensed.

12. The method according to claim 1, wherein the touch input arrangement and a proximity sensor configured to sense proximity of the object relative to the touch input arrangement are comprised in a second electronic device.

13. The method according to claim 1, wherein the touch input arrangement comprises a button.

14. The method according to claim 1, wherein the sub-display driver controls the one or more pixels of the sub-display area to display information related to the touch input arrangement while the display driver is off.

15. An electronic device for generating feedback related to an interaction with a touch input arrangement, wherein the electronic device comprises:

a display comprising a display area, wherein the display area comprises a sub-display area which is smaller than the display area;

a display driver configured to control a respective one of one or more pixels of the display area including one or more pixels of the sub-display area; and a sub-display driver configured to control the respective one of the one or more pixels of the sub-display area;

and wherein the touch input arrangement is arranged outside the display area of the display, wherein the electronic device is configured to:

in response to a sensed proximity of an object relative to the touch input arrangement, control, by the sub-display driver, the one or more pixels of the sub-display area to display information related to the touch input arrangement, and activate the sub-display area, independently of the remainder of the display area, in response to the sensed proximity of the object relative to the touch input arrangement.

16. The electronic device according to claim 15, wherein the electronic device is any of a mobile phone, a tablet, a TV, a monitor, electronic eyewear, a headset, an alarm clock, a car, and a music player.

17. A non-transitory computer readable medium having stored therein a computer program, comprising computer readable code that when, executed on an electronic device, causes the electronic device to perform a method, wherein the electronic device is for generating feedback related to an interaction with a touch input arrangement, wherein the electronic device comprises:

a display comprising a display area, wherein the display area comprises a sub-display area which is smaller than the display area;

a display driver configured to control a respective one of one or more pixels of the display area including one or more pixels of the sub-display area; and a sub-display driver configured to control the respective one of the one or more pixels of the sub-display area;

wherein the touch input arrangement is arranged outside a display area of the display, and wherein the method comprises:

in response to a sensed proximity of an object relative to the touch input arrangement, controlling, by the sub-display driver, the one or more pixels of the sub-display area to display information related to the touch input arrangement, and activating the sub-display area, independently of the remainder of the display area, in response to the sensed proximity of the object relative to the touch input arrangement.

* * * * *